Jan. 6, 1953 W. T. DUNN 2,624,211
TRANSMISSION CONTROL SYSTEM
Filed July 24, 1951 2 SHEETS—SHEET 1

INVENTOR.
William T. Dunn.
BY
Harness & Harris
ATTORNEYS.

Patented Jan. 6, 1953

2,624,211

UNITED STATES PATENT OFFICE 2,624,211

TRANSMISSION CONTROL SYSTEM

William T. Dunn, Detroit, Mich., assignor to Chrysler Corporation, Highland Park, Mich., a corporation of Delaware Application July 24, 1951, Serial No. 238,349

13 Claims. (Cl. 74—472)

This invention relates to motor vehicles and refers more particularly to power transmissions and control systems therefor.

My invention has particular reference to transmission control systems wherein the disengagement of positively engageable drive control elements is facilitated by relieving the torque load on these elements as by momentary interruption of the engine ignition system. Examples of transmissions of this character are described in the patents to Carl A. Neracher et al. 2,455,943 granted December 14, 1948, and Augustin J. Syrovy et al. 2,490,604 granted December 6, 1949.

It has been customary, as shown by the aforesaid patents, to provide a shiftable drive control element of toothed character arranged to interengage with a second toothed drive control element after passing through a toothed blocker. Engagement occurs upon synchronism obtaining between the drive control elements subsequent to engine deceleration by accelerator releasing movement, and the shiftable element is adapted to be unloaded, as described above, to facilitate its disengagement from its companion drive control element.

The drive control elements are generally so arranged in the transmission that upon relative engagement under governor control at or above a predetermined vehicle speed, there is provided a fast speed ratio drive through the transmission, usually a direct drive, and when relatively disengaged under governor control below a predetermined speed, or by kickdown means such as accelerator actuated switch means overruling the governor, there is provided another speed ratio drive which is usually a slower speed ratio drive than the first mentioned one.

Also customarily provided are prime mover or differential pressure servo motor means which may comprise a spring and a hydraulic or vacuum operated motor having a movable piston, for controlling shift of the shiftable drive control element through an associated shift rail or lever system. In the case of the hydraulic system, as typified by the Syrovy et al. patent aforesaid, pressure fluid acting upon the piston will cause it to compress a disengaging spring and an engaging spring, and build up sufficient available force in the latter to move the shift rail and by it the shiftable drive control element against its blocker and then into engagement with its companion drive control element when synchronization of the drive control elements subsequently occurs.

In the case of the vacuum power system, as typified by the Neracher et al. patent, vacuum is utilized to cause the piston to compress a disengaging spring and through a rod extension of the piston, unload an engaging spring previously tensioned by operation of the rod, the latter spring in turn acting upon a lever to effect movement of the shiftable element against its blocker and into subsequent engagement with its companion drive control element when the drive control elements obtain synchronism.

Transmission systems of the aforesaid typical character also usually include electromagnetically controlled valving for controlling venting (admission of atmospheric pressure) of the servo motor and operation of the piston such that when the motor is vented, the disengaging spring actuates the piston to effect disengaging shift of the shiftable drive control element accompanied by ignition interruption, the latter occurring as an incident to available lost motion operation of the piston relative to the shift rail in Syrovy et al., and the piston rod relative to the lever operating member in Neracher et al.

Customarily there is also provided an ignition interrupter switch operated by movement of the piston in Syrovy et al. or by the piston rod in Neracher et al. Moreover, as in the above patents, there is provided an electrical system intended to accommodate interruption of the engine ignition only during the disengaging stroke of the piston, it being so arranged that even though the ignition interruption switch closes on the return (engaging) stroke, the ignition is not ordinarily grounded out because at such time neither of the parallel arranged kickdown and governor switches which are arranged in series with the ignition interrupter switch and in series with the valve solenoid in a parallel circuiting is closed. Hence firing of the engine is not usually interrupted during acceleration from vehicle standstill in the slower speed ratio drive.

As improvements upon the Neracher et al. system of control, it has also been suggested, as shown in the patents to Albert E. Kimberly, Jr. 2,427,408 granted September 16, 1947, and Victor E. Matulaitis 2,291,189 granted July 28, 1942, to arrange the governor and kickdown switches in series with a ground and the valve solenoid and to provide a separate circuit for the ignition interruption control that includes the interrupter switch and means such as an additional switch or mechanical control means intended to render the ignition interrupter switch although actuated, operative to interrupt the ignition in only one direction of movement of the piston rod, whereas in Neracher et al. and Syrovy et al. aforesaid, the ignition interrupter switch is arranged in series with parallel governor and kickdown circuits.

Although the foregoing described arrangements have in general been satisfactory, they have been open to one or more unforeseen conditions of operation which it is desirable to avoid in order to provide a foolproof system. Thus in certain of the prior systems it has been possible to obtain ignition interruption while the transmission was in its lower gear, i. e., when the shiftable drive control element is disengaged, but at a time when the vehicle speed was such as to require the governor to call for an upshift. Under these conditions the shiftable drive control element moves against its blocker but obviously cannot engage until the relative speeds of the engageable drive control elements are synchronized by deceleration of the engine through accelerator releasing movement. Hence, should the operator instead of releasing the accelerator, accidentally or deliberately depress the accelerator to wide open throttle position in demanding further acceleration from the transmission (thus closing the kickdown switch) ignition interruption could occur and the kickdown operation would also vent the servomotor to allow the piston to recede and operate the ignition interrupter switch and even though the shiftable drive control element was not engaged.

This condition has also been found to occur under similar conditions when closing, opening and re-closing of the kickdown switch occurs due to unsteady pedal pressure or because of relative motion between the engine and throttle linkage.

Furthermore, in the arrangement disclosed by Neracher et al. and Syrovy et al., especially where a higher resistor type of ignition harness has been employed, some lurching of the vehicle has been noticeable in vehicle operation during upshifts. It is believed that in a circuiting wherein actuation of the interrupter switch places the ignition primary coil and the solenoid of the control valve in parallel circuits, the solenoid coil acts as a parallel impedance of low value to the primary coil of the ignition and causes the spark delivered by the secondary at the plugs at the time of current flow thereto to be weakened. In this connection, it may be observed that under normal engine operation the higher the engine R. P. M., the lower is the secondary voltage, and since the upshift takes place at a substantial R. P. M. the effect of the low impedance is to weaken the spark sufficiently so that it may be unable to keep the engine running momentarily, as by causing the engine to misfire. This condition can occur, for example, in the Neracher et al. arrangement and in the Syrovy et al. system when the relay coil of the latter has a low impedance effect on the ignition primary.

An object of my invention is to provide an improved ignition interruption control adapted for use, for example, with a transmission control system of the types disclosed in the aforesaid patents and which is capable of operation without accommodating actual ignition interruption or misfiring of the engine during the return i. e., upshift stroke of the piston, and which will positively, so far as now known, limit ignition interruption to only such occasions when it is intended to facilitate relative disengagement of the drive control elements.

Another object is to provide a transmission shift control system having means for interrupting the engine ignition when effecting disengagement of interengaged drive control elements but which system incorporates means associated with the motion transmitting means for the disengageable drive control element for preventing ignition interruption when the drive control elements are not engaged.

It is also an object of the invention to provide a transmission drive control system having means for interrupting the engine ignition when effecting a downshift and which includes means for preventing said interruption of the engine ignition by a driver initiated downshift operation in a vehicle speed range in which an upshift operation has been previously initiated, but not completed to the point of effecting engagement of the drive control elements.

Still another object of the invention is to provide a transmission shift control system having means for interrupting the engine ignition when effecting a downshift, but which system inhibits weakening of the ignition spark intensity during the upshifting operations.

Still another object is to provide a transmission shift control system having means for interrupting the engine ignition when effecting disengagement of the drive control elements, but which system provides safeguards both against weakening of the ignition spark intensity during upshifting and against ignition interruption when a driver downshift operation is initiated in a vehicle speed range accommodating an upshift but which upshift has not been completed.

A specific object of the invention is to provide a transmission shift control system having means including an ignition interrupting switch for interrupting the engine ignition when effecting disengagement of interengaged drive control elements one of which elements is a shiftable element, which interruption means includes control means associated with the motion transmitting means for the shiftable element and with the interrupter switch for preventing actuation of the ignition interrupter switch during engaging operations of the shiftable element and during a kickdown operation initiated when the shiftable element is not engaged but is against its blocker.

Another specific object is to provide a transmission shift control system having switch means for interrupting the engine ignition and which includes controllable structure operable upon said switch only when effecting disengagement of the interengaged drive control elements.

A further specific object is to provide in a transmission having a differential pressure servomotor shift mechanism including a piston, a shift rail and an ignition interrupting switch, a switch operating structure carried by the shift rail and operable by the piston but operable such that ignition interruption occurs only when effecting disengagement of the interengaged drive control elements.

Other objects and features of my invention will be apparent from the following description wherein:

Figure 3 is an elevational view similar to a portion of that in Figure 2 and showing the power shiftable clutch sleeve in its direct drive or engaged position and the power shifting mechanism in the corresponding position;

Figures 5, 6, and 7 are enlargements of the interrupter switch and operating mechanism in the positions of Figures 2, 3, and 4 respectively, whereas

Figures 1, 2:
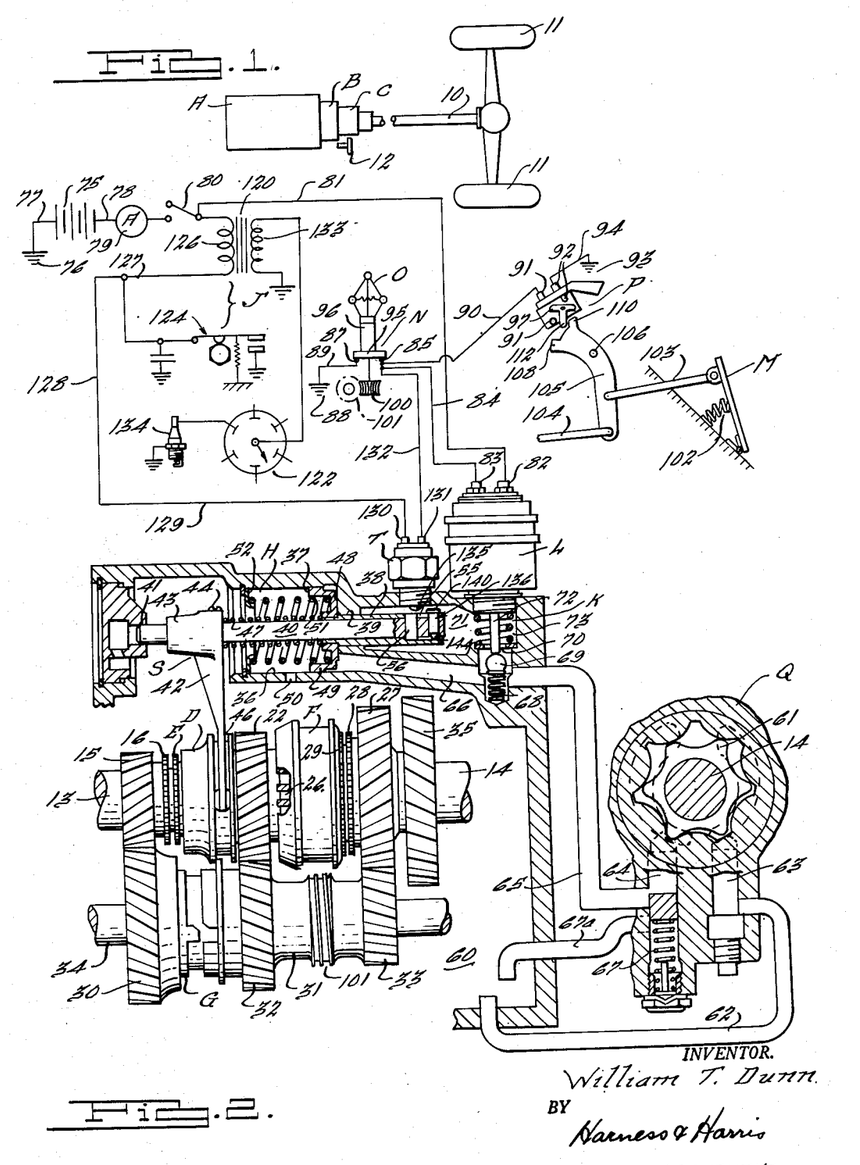
Figure 1 is a diagrammatic plan view of the driving power plant for the vehicle.
Figure 2 is an elevational view partly in section of my invention as applied to a semi-automatic four speed forward and reverse transmission, a part of the control system being schematically illustrated, the manually operable clutch sleeve being shown in its forward or high range position for starting the vehicle from rest, and the power shiftable mechanism and power operable clutch sleeve being shown in the released position of the latter.

In the drawings in which similar numerals indicate similar parts of the structure, Figure 1 illustrates a typical motor vehicle power plant having a conventional engine A for transmitting power through a propeller shaft 10 to drive the rear ground wheels 11. In the housing B there may be provided a fluid power transmitting device, such as a fluid coupling arranged in tandem with a master friction clutch of known type, the latter being releasable to uncouple the engine from the transmission by operation of a conventional clutch pedal 12. Rearwardly of the housing B is a transmission C which may be any type incorporating positively engageable drive control elements of a character usually subject to substantial thrust or torque load in operation, the latter conditions making the use of some form of unloading means desirable to insure release of the drive control elements when a speed change requiring disengagement of these elements is necessary.

The transmission C may be of various known types. For purposes of illustration I have shown in Figure 2, a commercial form of four-speed and reverse countershaft underdrive transmission. This transmission comprises an input or driving shaft 13 which receives drive from the engine A by way of the clutch assembly B, and an output or driven shaft 14 which is adapted to transmit drive to the propeller shaft 10. The driving shaft 13 carries the main driving gear or pinion 15 and a set of positive jaw clutch teeth 16 which are adapted to be engaged by the teeth of a jaw clutch sleeve D. As will be hereinafter seen, the sleeve D together with the clutch teeth 16 comprise relatively movable drive control elements for effecting stepup and stepdown manipulation of the transmission.

The clutch sleeve D is slidably splined on teeth, not shown, of a forward hub portion of the high or third speed gear 22 which is rotatably journalled on the driven shaft 14 and adapted to be clutched thereto through a jaw clutch sleeve F slidably splined on a hub, not shown, drivingly carried by the shaft 14 and interengageable with jaw clutch teeth 26 carried by the gear 22. The forward shift of sleeve D for clutching with teeth 16 is normally controlled or impeded by a toothed blocker E whereby clutching is limited to synchronous relationship in the speeds of rotation of gears 15 and 22 and, in the particular construction illustrated, limited to engine coast conditions obtainable by accelerator releasing movement to secure deceleration of the engine. The blocker E is journalled on a conical surface, not shown, carried by the shaft 13 against which it is frictionally urged by a spring, also not shown, and has a limited lost motion connection with the sleeve D or gear 22 whereby it may rotate to place its teeth in blocking relation to the teeth of sleeve D whenever the gear 15 rotatably leads or lags the sleeve D. When sleeve D moves past the blocker E into engagement with the clutch teeth 16, the gears 15 and 22 are placed in a two-way direct drive relationship.

Gear 22, as stated above, is loosely journalled on the driven shaft 14 whereas the pinion 15 is part of the input shaft 13. Also loosely journalled on the output shaft 14 is a low or first speed gear 27 having jaw clutch teeth 28 engageable by the sleeve F. Associated with the sleeve F on each side thereof is any commercial type of blocker synchronizers 29 such that clutch F may be shifted from a neutral position disengaged from teeth 26 and 28 forwardly to a high range position to synchronously clutch shaft 14 with the high speed gear 22 through the teeth 26 or rearwardly to a low range position to synchronously clutch shaft 14 with the low speed gear 27 at its teeth 28. Manual shifts of the main sleeve F are facilitated by release of the main clutch at B by means of the clutch pedal 12.

Gear 22 is also adapted to be driven from gear 15 at a speed different from 1:1 and to this end I have shown a countershaft type one-way reduction driving means between these gears. This drive comprises the coaxially rotatable countershaft gear 30 and cluster gear 31 wheels 32, 33 respectively, in constant mesh with gears 15, 22, and 27 and an overrunning roller clutch G operably interposed therein between the gear 30 and cluster 31. A stationarily mounted countershaft 34 provides a journal support for the countershaft gears. Assuming the usual clockwise rotation of shaft 13 as viewed when looking from front to rear of Figure 2, then overrunning clutch G will automatically clutch gear 30 and cluster 31 together when gear 30 is driven counterclockwise at a speed tending to exceed that of the cluster 31 and automatically release the drive between these gears to allow gear 30 to slow down below the speed of cluster 31. For obtaining reverse drive an idler gear (not shown) having constant mesh with the gear 33 is shiftable rearwardly into mesh with a gear 35 fixed on shaft 14, the clutch F being then in its neutral position disengaged from teeth 26 and 28.

As thus far described, it will be apparent that with the parts arranged as in Figure 2, sleeve F being then in high range position engaged with teeth 26, drive of shaft 13 will cause the output shaft 14 to be driven at a reduction drive (third speed) through the gears 15, 30 overrunning clutch G, gears 32, 22 and sleeve F. Should the sleeve D be biased forwardly during this reduction drive, blocker E will obstruct sleeve D in an intermediate position of its shift preventing ratcheting of its teeth with the teeth 16. However, if the driver releases the engine throttle control in the form of the usual accelerator pedal then, as will be apparent, overrunning clutch G will allow gear 15 and teeth 16 to slow down relative to the sustained speed of gear 22 and when the speed of gear 15 reaches synchronism with that of gear 22, blocker E will move to an unblocking position and allow sleeve D to move further forwardly to clutch its teeth with teeth 16 to the position shown in Figure 3, to provide he direct drive (fourth speed), clutch G continuing its overrunning operation. Upon return of sleeve D to disengaged position shown in Figure 2, followed by speeding up the engine, overrunning clutch G will automatically engage to restore the reduction drive.

When clutch sleeve F is shifted rearwardly to low range position to clutch gear 27 to shaft 14 an overrunning slow speed drive (first speed) is transmitted from the shaft 13 to the shaft 14 by way of the gears 15, 30, overrunning clutch G, gears 33 and 27 and sleeve F. At such time as the sleeve D is biased forwardly and the shaft 13 is allowed to slow down to permit the teeth 16 to become synchronized with the sleeve D, the sleeve will move past the blocker E and clutch with the teeth 16 to establish a two-way relatively fast speed drive (second speed) in the low range, which drive will be from the shaft 13 through the sleeve D, gears 22 and 32, gears 33 and 27, and clutch F to the shaft 14, the clutch G overrunning by reason of the cluster 31 rotating at a higher speed forwardly than the gear 30.

It will be understood the driver may start the vehicle from rest in the low range drive and subsequently shift to the high range incident to momentary release of the master clutch and this either prior to or subsequent to engagement of the clutch D. Most drivers, however, usually start the vehicle from rest in the slow speed ratio of the high range and at a subsequent higher speed obtain the automatic upshift to direct drive by momentary release of the accelerator pedal described above.

A more complete description of the transmission specifically illustrated in this application and its method of operation is set forth in the patent to A. J. Syrovy et al. 2,490,604 aforesaid.

A speed responsive governor means O is provided to control forward bias of the sleeve D as well as rearward bias thereof as will be presently more apparent. Moreover, during drive in either second or fourth speeds referred to above, a downshift to first or third speeds respectively may be effected by way of overruling the governor O through driver depression of the accelerator pedal M to substantially wide open throttle position, which operation is referred to in greater detail below.

As seen in Figure 2, I have illustrated a servomotor H by which to obtain power actuation of the clutch sleeve D, the motor here illustrated being of the pressure differential and spring operated type and in the disclosed embodiment functioning by means of fluid pressure. This motor preferably comprises a cylinder 36 slidably receiving a piston 37. The piston has a rearward integral tubular extension 38 which is journalled in the guideway 39 and slidably receives a shift rail or rod 40, the forward end of which is mounted to operate in a guideway 41. Fixed to the rail 40 is a yoke 42, a hub portion 43 of which is secured to the rail 40 by means of a dowel screw 44. The rod 40 and yoke 44 constitute motion transmitting means S for the sleeve D, the yoke 42 as seen in Figure 2, having fingers 45 engaging in a groove 46 of the sleeve D to effect shift thereof.

A relatively small preloaded engaging spring 47 surrounds the rail 40 and is disposed between the hub 48 of piston 37 and the hub 43 of the yoke 41. This spring 47 provides a lost motion thrust transmitting connection between the piston 37 and the hub 43 of the motion transmitting means S such that the piston 37 may be moved forwardly (to the left in Figure 2) for its power stroke, the piston 37 continuing its forward motion by fluid pressure even after the clutch D has been moved against the blocker E until the lip 49 of the piston uncovers the relief port 50 of the cylinder 36, whereupon forward movement of the piston 37 will cease, the fluid pressure being then expended through the relief port 50.

During the said forward movement of the piston 37 the engaging spring 47 is compressed and urges the rail 40 through the hub 43 of the yoke 42 forwardly thus in turn shifting the clutch sleeve D to its intermediate position blocked by the blocker E. Subsequently upon synchronous rotation of the teeth 16 and sleeve D being obtained in response to accelerator releasing movement, the sleeve D is moved through the blocker E into engagement with the teeth 16 of the drive pinion 15, which is its fully engaged upshifted position shown in Figure 3, establishing the previously described direct drive between the shaft 13 and gear 22.

A relatively large preloaded downshift or kickdown spring 51 is disposed between an abutment ring 52, located at the forward end of the cylinder 36, and the piston 37. This spring serves to return the piston 37 and sleeve D from their Figure 3 positions to their downshifted or disengaged position shown in Figure 2. It will be observed from Figure 3 that the piston 37 when in its furthest forward position shown in this figure uncovering the port 50 has moved further than the shift rail 40 such that a gap 53 is created between the forward end 54 of a slot 55 in the piston extension and a cross pin 56 on the rail 40 projecting into the slot 55 which pin serves as a stop shoulder for the piston 37 and to prevent relative rotation between the rail 40 and the piston 37. The slot 55 is of sufficient length to maintain the pin 56 therein during all relative movement between the piston 37 and rail 40.

The gap 53 facilitates lost motion movement of the piston 37 relative to the shift rail 40 prior to disengaging movement of the sleeve D which can only commence following abutment of the slot end portion 54 of the piston extension 38 with the pin 56. As previously noted, forward movement of the piston 37 is stopped upon uncovering the port 50, the latter permitting any pressure in excess of that required to hold the piston 37 in its furthest forward position to be relieved, and preventing the building up of such excess pressure in the cylinder 31.

The pressure fluid supply system is shown in Figure 2 and comprises a suitable supply source 60, which is usually the transmission sump. A pump Q of the rotary gear type is mounted on the shaft 14 and has its rotor 61 driven by that shaft, oil being drawn from the supply source 60 through the conduit 62 to the pump inlet 63 and is delivered under pressure at the pump outlet 64 to the conduit 65 and then to the passage 66 under control of a ball valve K. A relief valve, generally designated by the numeral 67 and provided at the pressure side of the pump between the outlet 64 and the ball valve K serves as a relief valve in the event the valve K is not open in normal operation of the transmission to thereby permit pressure fluid trapped behind the piston 37 to be dumped back into the transmission sump 60 through the conduit 67a.

Figures 3, 5, 6, 7:
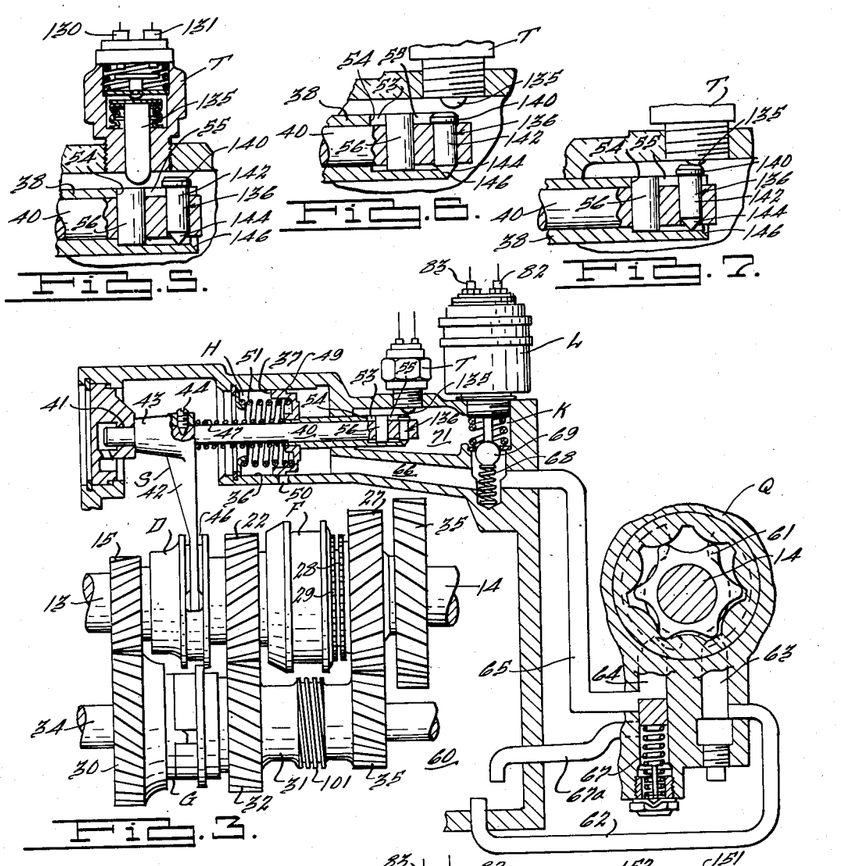

When the valve K is closed, oil under pressure is forced directly from the pump through the passage 66 to the cylinder 36 where it moves the piston 37 forwardly to effect forward movement of the shift rail 40 in the manner described above whereby the shift sleeve D is operated from its disengaged position in Figure 2 to its engaged position of Figure 3 to establish second or fourth speed ratio drive depending upon whether the clutch F is engaged with the first speed gear 27 or with the third speed gear 22.

Valve K is closed by bias of a valve spring 68 acting against a ball 69 to close a discharge port 70 opening into a passage 71 draining to the sump or supply source 60. The valve K is actuated to its open position under control of an electromagnetic device comprising a solenoid L having a plunger 72 connected with the movable core of the solenoid. The valve K is closed when the solenoid L is deenergized. The spring 68 then actuates the ball 69 against a seat 73 to close the port 70 and effects movement of the solenoid plunger 72 to its retracted position. The valve K is open when the solenoid L is energized, the solenoid core then moving the plunger 72 downwardly to push the ball 69 off the seat 73 of port 70. The oil may now flow from the pump Q through the conduit 65, port 70, passage 71, back to the sump 60.

When the valve K is open, it is impossible for sufficient fluid pressure to develop in the passage 66 to move the piston 37 against the force exerted by the piston return spring 51 which then maintains the piston at the extreme rearward position of its capable movement. Hence the piston 37 is actuated by fluid pressure only to establish second and fourth speeds respectively at which time the valve K is closed and the solenoid L deenergized. Figure 2 shows the valve K in its open position and the piston 37 in its position retracted by spring 51, and Figure 3 shows the valve K in its closed position and the piston 37 in its furthest forward position under control of the pressure fluid.

Energization and deenergization of the solenoid L is brought about by operation from one position to another of either of two control members, one actuated in response to vehicle speed, and the other in response to manipulation by a driver control member. One of these control members is the governor O, and the other is a kickdown switch generally designated by the letter P. Suitable electrical circuit means are provided for effectuating the control operation of the governor and kickdown switch over the solenoid L. Thus a suitable source of electrical energy, for example, a storage battery 75 has one side grounded as at 76 by a conductor 77 and its other side connected by a conductor 78 through an ammeter 79 to the ignition switch 80. A conductor 81 connects the ignition switch with one terminal 82 of the solenoid L, the other terminal 83 of the solenoid being connected by a conductor 84 with a terminal 85 of a switch generally designated by the letter N which is operated by the governor O and which has a second terminal 87 connected to a ground 88 by a conductor 89. From the governor switch terminal 85 a conductor 90 extends to a terminal 91 of the kickdown snap switch P, this switch having a second terminal 92 connected to a ground 93 by a conductor 94.

The governor switch N is closed by a movable conductor switch bar 95 operated by an insulated sliding sleeve 96 of the governor O, the switch being closed when the bar 95 bridges the terminals 85 and 87. The kickdown switch P is of the snap type and has a conductor bar 97 which closes the same by bridging the terminals 91 and 92 of this switch.

Thus by means of the governor switch N and the kickdown switch P, two parallel ground circuits are provided for the solenoid L, the governor switch N opening at a speed proportional to vehicle speed established by the drive connection 100, 101 between the governor O and the countershaft cluster 31. It will be understood that the governor driving means 101 may if desired be on the driven shaft 14.

The kickdown switch P, as shown in Figure 2, is in open position under control of a coil spring 102 and which biases the accelerator M to its released position.

The accelerator M is suitably connected with the usual engine carburetor throttle valve by means including linkage 103, 104 which serves to open and close the throttle valve. Interposed in the throttle valve operating linkage is a lever 105 pivotally supported at 106 and having spaced fingers or projections 108, 110 for operating the actuating finger 112 of the snap switch P. The mechanism is preferably arranged such that in operation, the switch finger 112 is engaged by the lever projection 108 as the throttle valve in response to depression of the accelerator M approaches its full open throttle position, so that the switch P is closed with snap action during approximately the last 5° or so of throttle opening movement. It will be understood that the operation of this switch may be adjusted to occur subsequent to full open throttle position by the provision of suitable lost motion mechanism such as disclosed in the patent to Neracher et al. 2,455,943. When the accelerator M is released, the finger 110 comes into contact with the actuating finger 112 of the switch near the fully released position of the accelerator to actuate the switch P to its open position, again by snap action, the parts being so arranged that the switch P will be opened by finger 110 whenever the accelerator pedal is fully released.

The ignition mechanism generally designated by the letter J is of conventional type and includes an ignition coil 120, a distributor 122, and a breaker 124. From the primary coil 126 an ignition grounding circuit is provided that extends through the conductors 127, 128, 129 to terminal 130 of a normally open interrupter switch T and thence from terminal 131 thereof by the conductor 132 to the ground 88 provided by the governor switch N or by conductors 132 and 90 to the ground 93 of the kickdown switch P.

As noted above, prior control circuits and structures made feasible interruption of the ignition during and uncompleted upshift through accidental or deliberate operation of the kickdown switch by the accelerator and in systems providing a common ground for the ignition primary coil and the solenoid L in parallel arranged circuits made it possible for the solenoid L to act as a parallel impedance of low value to the primary coil and weaken the spark delivered by the secondary winding 133 at the plugs 134 when current flow thereto took place. A feature of the present invention is to overcome these difficulties. In order to accomplish this I preferably provide the piston 37 with the extension 38 described above and provide movable means on the switch pawl 40 adapted to be positioned and operated to actuate the operating element or ball 135 of the interrupter switch T during the rearward or clutch D disengaging movement of the motion transmitting means S only.

As seen in the drawings, I preferably provide on the shift rail 40 rearwardly of the pin 56 a cylindrical shaped dog or pin switch actuator 136 which is slidably fitted in a bore 138 having its axis coincident with the axis of the switch T and operating element 135. Preferably in order to enable free upward movement of the dog 136 in the bore 138 past the wall of the piston extension 38, the bore 138 is also arranged parallel to the pin 56 and normal to the slot 55 of the piston extension 38. Moreover, the dog member 136 is of smaller transverse dimension than the slot 55 such that the dog may work up and down in the slot. The dog member has a head portion 140 preferably flat but suitably shaped to cam relative to the switch element 135 to effect movement of the latter to operate the switch T. The head portion 140 is moreover, made larger transversely than the shank 142 of the dog such that the dog 136 will not fall through the bore should the extension 38 of the piston be moved forwardly sufficiently to be free of the dog.

The lower end of the shank 142 is conical shape to provide a cam surface 144 adapted to coact with a cam face 146 formed at the outer end of the piston extension 38 on the axis of the dog 136. When the piston extension moves rearwardly relative to the rail 40 to take up the lost motion 53 described above, the cams 144, 146 interact and the dog 136 is raised to actuate the operating member 135 of the switch T. When the cam 146 moves away from the cam 144 the dog 136 drops clear of the operating member 135.

Figure 8:
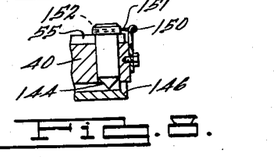
Figure 8 is a modification.

The downward movement of the dog 136 is by gravity action there being sufficient vibration during operation of the vehicle imparted to the transmission to prevent sticking of the dog 136. The axis of switch T and dog 136 will therefore be selected to accommodate gravity action on the dog. It will be understood, however, that suitable spring means may be provided if desired to bias the dog 136 to its position clear of the element 135. In this connection I have illustrated in Figure 8 a modification wherein the dog 136 has a downward spring bias by means of a finger spring 150 mounted on the end of rail 40 and having a finger extension 151 received in a slot or bore 152 in the head 140 of the dog 136.

It is to be noted that the relationship between the cam faces 144, 146 longitudinal of the rail axis should be such that the cam face 146 may move into contact with the cam face 144 and raise the dog 136 to actuate the switch T during the lost motion movement 53 of the piston 37 relative to the rail 40 at the beginning of the disengaging operation of the clutch D. Thereafter the piston and rail will move together to the clutch D released position in Figure 3, the dog 136 remaining in its raised position. When the clutch D is to be engaged, the piston and rail with the dog 136 still raised will move together to the blocked position of the sleeve D. The dog 136 will at this time be still rearwardly of the switch element 135. The piston, however, will continue forward movement to the end of its stroke as seen in Figure 3 during which movement the cam 146 will move away from the cam 144 to enable the dog 136 to drop clear of the switch element 135 such that the dog may pass by the switch T to the position shown in Figure 3 without operating the switch T.

The operation of the transmission and control system will now be descrbied. Let it be assumed that the vehicle is at a standstill with the manual sleeve F shifted forwardly in engagement with the teeth 26 of the third speed gear 22, as seen in Figure 2. At this time the governor switch N will be closed and provides a circuit from battery 75 to ground 88 by way of the conductors 81 and 84 and solenoid L thus energizing the latter whereby the solenoid rod 72 maintains the ball 69 of the valve K in its down position venting the motor H so that spring 49 holds the clutch sleeve D in the position shown in this figure. The interrupter switch T is open as shown, the outer end of the operating element 135 of the switch T being free of the head 140 of the dog 136. The kickdown switch P is open since the accelerator pedal is released.

By depressing the accelerator pedal the vehicle is driven in third speed ratio drive. At some predetermined speed of vehicle travel, for example, 12 to 14 M. P. H. (6 to 7 M. P. H. in first speed), the governor O actuates the switch N to open position. The solenoid L is thereupon deenergized and valve K closed by operation of the spring 68 which moves the ball 69 to close the port 70 at the entrance of return passage 71, thus permitting pressure to be built up by the pump Q in the passage 66.

At the moment of operation of the solenoid L the ignition interrupter switch T is in open position as seen in Figures 1 and 5, and as there shown, the switch actuating dog 136 is rearwardly of the switch element 135 and in its up position.

When the fluid pressure builds up sufficiently, the piston 37 moves forwardly for its upshift stroke and comes to rest at the position shown in Figure 3 where the relief port 50 is uncovered to relieve the fluid pressure and maintain the piston at this position. The forward movement of the piston 37 is utilized in compressing the springs 46 and 49. Initially the spring 46 moves the motion transmitting means S and thereby the sleeve D to its blocked position against the blocker E. The dog 136 also moves forwardly with the rail and remains in its up position but is still rearwardly of the switch element 135 when the blocked position of the sleeve D is reached. Then lost motion movement takes place between the piston and shift rail 40, the piston continuing to its final position seen in Figure 3 uncovering the relief port 50 and further compressing the springs 47 and 51.

During the initial relative movement between piston and rail the cam faces 144, 146 move away from each other enabling the dog 136 to drop clear of the switch T element 135 before it reaches a position under the latter. During the remainder of the piston movement the dog 136 reaches its complete down position seen in Figures 3 and 6. Thereafter, upon accelerator releasing movement to synchronize the speeds of the sleeve D and the clutch teeth 16, the sleeve D is moved by the spring 47 acting upon the yoke 42 of the motion transmitting means S to its engaged position seen in Figure 3. During this movement the rail 40 also moves forwardly to its Figure 3 position but the dog 136 remains in its down position of Figures 3 and 6.

Since switch T is not operated during the forward movement of the piston the ground circuit for the primary coil is not closed and hence the ignition is not interrupted. Moreover, as the switch T is in series with the ground 88 of governor switch N and also with the ground 93 of kickdown switch P, should the accelerator pedal be depressed to full open throttle position to actuate the switch P and energize solenoid L at a time when the governor switch N is open and the sleeve D is against the blocker, the ignition will not be interrupted unless the switch T is closed. However, in the situation described the switch T will not be actuated by the dog 136 when the pressure is released in the cylinder 36, because at that time the shift rail 40 is in the blocked position of the sleeve D and its dog 136 is still rearwardly of the switch T operating element 135. Hence although the piston in its rearward movement will cause the dog 136 to be raised, the element 135 of the switch T will not be actuated to close that switch.

Therefore, the switch T is not operated at all during the forward movement of the piston to establish the sleeve D to its blocked position or during a return movement of the piston if the motor H is vented before the sleeve D is engaged. Moreover, the secondary winding 133 of the ignition system cannot be weakened during upshift since the switch T cannot be closed.

Once established in fourth speed, a downshift to third speed is effected either by manually closing the kickdown switch P by means of the accelerator pedal M or by the automatic closing of the governor switch N when the speed of the vehicle drops below the upshift speed set for the transmission. For example, when the driver desires to manually effect the downshift from fourth speed he fully depresses the accelerator M. During this operation the switch P is closed. Since the engine is then delivering its full power, it is desirable to effect torque relief at the teeth 16 to facilitate the release of sleeve D for the downshift. At this time the switch T operating mechanism is in the position shown in Figure 3, with the piston 37 adjacent the relief opening 48, the shift rail 38 in its fully engaged position forwardly, and the interrupter switch actuator dog 136 is in its down position with part of its head portion 140 immediately below the switch operating element 135. Closing of switch P applies ground 93 to the valve solenoid L circuit from the battery 75 causing energization of the solenoid and opening of the valve K to vent the motor H.

Figure 4:
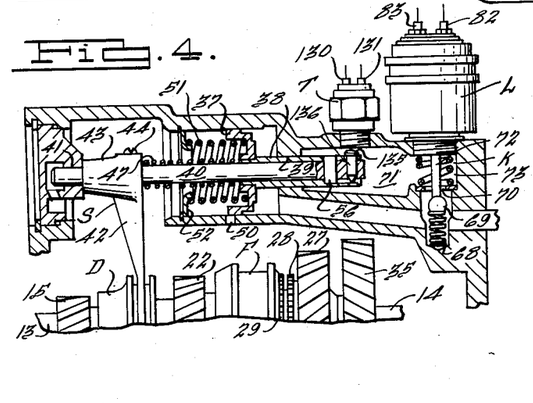
Figure 4 is a view similar to that of Figures 2 and 3 illustrating the piston of the power shift mechanism in its position about to initiate disengaging movement of the power shift sleeve.

As noted above, the interrupter switch T which connects by the conductors 128 and 129 with the primary winding 126 of the ignition coil is in series with the ground 93 established by the kickdown switch P, but this ground cannot be applied to the ignition system because the switch T is open. Usually when the pressure is vented in the cylinder 36 the sleeve D remains engaged by reason of the thrust load on its teeth which is greater than the effective push of the downshifting spring 51. However, advantage is taken of the ability of the piston to begin its return movement without the sleeve D to the extent of the lost motion distance 53 between the piston extension and the rail pin 56. This position is seen in Figures 4 and 7. In taking up this lost motion the cam face 146 of the piston extension 38 will strike the cam 144 of the dog 136 raising the latter sufficiently to actuate the switch element 135 to close the switch T, and ground the primary winding 126 of the ignition system.

The engine now missing fire, unloads the thrust on the teeth of the sleeve D and member 16 and permits disengagement of the sleeve D to take place under the urging of spring 51. Since the piston extension 38 is at this moment against the pin 56, the piston and rail will move rearwardly together, the head 149 of the dog 136 having sufficient surface to keep the switch T closed and the ignition grounded until the sleeve D is completely disengaged from the teeth 16, whereupon the rail 40 with dog 136 still in raised position, moves away from the switch element 135 to permit the switch to open and restore the ignition. The parts will now be in the position shown in Figures 1 and 5.

The dog 136 will remain in raised position until upshift is again called for whereupon the piston will, as previously described, move forwardly sufficiently to permit the dog 136 to drop to a position in which it will clear the switch element 135 in its furthest forward movement.

When the accelerator M is later released sufficiently to open switch P, fourth speed may be again restored as previously described, provided the vehicle speed is still such that the governor switch N is open.

For the automatic downshift from fourth to third under governor control of the vehicle governor O, it is only necessary to reduce the vehicle speed to or below the speed at which the governor switch N normally closes. This closing of the switch N energizes the solenoid L by effecting a circuit from the battery 75 to the ground 88. The motor H is then vented as described above with respect to the kickdown operation and the interrupter switch T is similarly operated.

When the sleeve F is in its rearward or low range position, then upshift and downshift movement of sleeve D will be the same as that set forth for operation of this sleeve in the high range setting. However, since the governor O is driven from the countershaft as at 101 in Figure 2, the governor O will function at a somewhat lower car speed depending on the gear ratios for first and second as compared with third and fourth as will be readily understood.

From the foregoing description of my invention, it will be apparent that I have provided a novel and foolproof ignition interrupter control system and structure for transmissions having both governor and manually controlled downshifting wherein ignition interruption for disengaging engaged clutch elements is initiated at required times only.

It will also be apparent that the invention is applicable to other forms of transmissions. Moreover, although the disclosed embodiment of the invention is well adapted for carrying out the objects hereinabove set forth, it will be understood that various modifications, changes, and substitutions coming within the spirit of my invention and within the scope of the appended claims are also contemplated.

I claim:

1. In a power transmission for driving a vehicle having an engine provided with an ignition system; a shiftable transmission drive controlling element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable element, actuating means operable upon said motion transmitting means for effecting shift of said shiftable drive control element between its two said positions, circuit means including a switch for controlling interruption of the ignition system, and a switch actuated member carried by said motion transmitting means and operable by said actuating means for actuating said switch.

2. In a power transmission for driving a vehicle having an engine provided with an ignition system; a shiftable transmission drive controlling element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable element, actuating means operable upon said motion transmitting means for effecting shift of said shiftable drive control element between its two said positions, circuit means including a switch for controlling interruption of the ignition system, dog means carried by said motion transmitting means and movable relative to said switch and means on said actuating means operable upon said dog means for moving said dog means to actuate said switch.

3. In a power transmission for driving a vehicle having an engine provided with an ignition system; a shiftable transmission drive controlling element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable element, actuating means operable upon said motion transmitting means for effecting shift of said shiftable drive control element between its two said positions, circuit means including a switch for controlling interruption of the ignition system, a movable switch actuating member movable with said motion transmitting means and selectively positionable in two positions in one of which only it is adapted to actuate said switch, and means on said first mentioned actuating means operable for directing said member into said one position and operable for accommodating movement of said member to the other of said two positions.

4. In a power transmission for driving a vehicle having an engine provided with an ignition system; a shiftable transmission drive controlling element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable element, actuating means operable upon said motion transmitting means for effecting shift of said shiftable drive control element between its two said positions, circuit means including a switch for controlling interruption of the ignition system, a movable switch actuating member movable with said motion transmitting means and selectively positionable in two positions in one of which only it is adapted to actuate said switch, means on said first mentioned actuating means operable for directing said member into said one position and resilient means for directing said member into the other of said two positions.

5. In a power transmission for driving a vehicle having an engine provided with an ignition system; a shiftable transmission drive controlling element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable element, actuating means operable upon said motion transmitting means for effecting shift of said shiftable drive control element between its two said positions, circuit means including a switch for controlling interruption of the ignition system, a movable switch actuating member movable with said motion transmitting means and selectively positionable in two positions in one of which only it is adapted to actuate said switch, cam means on said movable switch actuating member, and cam means on said first mentioned actuating means operable upon said switch actuating member cam means for directing said member into said one position.

6. In a power transmission for driving a vehicle having an engine provided with an ignition system, a shiftable transmission drive control element, another drive control element engageable with said shiftable element, motion transmitting means operable for shifting said shiftable element from a first position of disengagement relative to said other control element to a second position of engagement relative thereto and out of said second position when operation of said ignition system is momentarily interrupted to relieve the thrust load at said shiftable element, power means including a reciprocable element operable upon said motion transmitting means for effecting shift of said shiftable control element between said positions, said power means being operable to provide for lost motion movement of said reciprocable element relative to said motion transmitting means when effecting shift of said shiftable element from its disengaged to its engaged position, an ignition interrupting switch operable for interrupting the ignition system, and movable switch actuating means carried by one of said motion transmitting means and reciprocable element operable in response to movement of said reciprocable element in taking up said lost motion movement for actuating said switch to interrupt said ignition system.

7. In a power transmission for driving a vehicle having an engine provided with an ignition system, a shiftable transmission drive control element, another drive control element engageable with said shiftable element, motion transmitting means operable for shifting said shiftable element from a first position of disengagement relative to said other control element to a second position of engagement relative thereto and out of said second position when operation of said ignition system is momentarily interrupted to relieve the thrust load at said shiftable element, power means including a reciprocable element operable upon said motion transmitting means for effecting shift of said shiftable control element between said positions, said power means being operable to provide for lost motion movement of said reciprocable element relative to said motion transmitting means when effecting shift of said shiftable element from its disengaged to its engaged position, an ignition interrupting switch operable for interrupting the ignition system, and movable switch actuating means carried by one of said motion transmitting means and reciprocable element and operable by the other thereof in response to movement of said reciprocable element in taking up said lost motion movement for actuating said switch to interrupt said ignition system when effecting shift of said shiftable element from its said engaged to its said disengaged position.

8. In a power transmission for driving a vehicle having an engine provided with an ignition system, a shiftable transmission drive control element, another drive control element engageable with said shiftable element, motion transmitting means operable for shifting said shiftable element from a first position of disengagement relative to said other control element to a second position of engagement relative thereto and out of said second position when operation of said ignition system is momentarily interrupted to relieve the thrust load at said shiftable element, power means including a reciprocable element operable upon said motion transmitting means for effecting shift of said shiftable control element between said positions, said power means being operable to provide for lost motion movement of said reciprocable element relative to said motion transmitting means when effecting shift of said shiftable element from its disengaged to its engaged position, an ignition interrupting switch operable for interrupting the ignition system, movable switch actuating means carried by one of said motion transmitting means and reciprocable element and operable by the other thereof from a first to a second position in response to movement of said reciprocable element in taking up said lost motion movement for actuating said switch to interrupt said ignition system when effecting shift of said shiftable element from its said engaged to its said disengaged position, and means on said other of said motion transmitting means and reciprocable element accommodating return of said switch actuating means to its said first position when effecting said lost motion movement during shift of said shiftable element from its said disengaged to its said engaged position whereby said switch is not actuated to interrupt the ignition system during this shifting operation.

9. In a power transmission for driving a vehicle having an engine provided with an ignition system, a shiftable transmission drive control element, another drive control element engageable with said shiftable element, motion transmitting means operable for shifting said shiftable element from a first position of disengagement relative to said other control element to a second position of engagement relative thereto and out of said second position when operation of said ignition system is momentarily interrupted to relieve the thrust load at said shiftable element, power means including a reciprocable element operable upon said motion transmitting means for effecting shift of said shiftable control element between said positions, means providing an abutting connection between said reciprocable element and said motion transmitting means, said reciprocable element being movable from a first position corresponding to said disengaged position of said shiftable element and wherein said abutting connection is established to a second position and incident to said movement releasing said connection and obtaining lost motion movement between said reciprocable element and motion transmitting means to condition the latter for effecting engaging shift of said shiftable element, said reciprocable element being also movable from said second position to said first position and incident thereto taking up said lost motion movement to restore said abutting connection and actuating said motion transmitting means to effect shift of said shiftable element from its said engaged to its said disengaged position, an ignition interrupting switch operable for interrupting the ignition system, and movable switch actuating means carried by one of said motion transmitting means and reciprocable element, operable by the other thereof in response to movement of said reciprocable element to take up said lost motion movement for actuating said switch to interrupt said ignition system, and accommodating restoration of said ignition system during movement of said receprocable element from its said second to its said first position following re-establishment of said abutting connection.

10. In a power transmission for driving a vehicle having an engine provided with an ignition system, a shiftable transmission drive control element, another drive control element engageable with said shiftable element, motion transmitting means operable for shifting said shiftable element from a first position of disengagement relative to said other control element to a second position of engagement relative thereto and out of said second position when operation of said ignition system is momentarily interrupted to relieve the thrust load at said shiftable element, differential pressure fluid servomotor means including a reciprocal piston operable upon said motion transmitting means for effecting shift of said shiftable control element between said positions, means providing an abutting connection between said piston and motion transmitting means, said piston being movable from a first position corresponding to said disengaged position of said shiftable element and wherein said abutting connection is established, to a second position and incident to said movement releasing said connection and obtaining lost motion movement between said piston and motion transmitting means whereby to condition the latter for effecting engaging shift of said shiftable element, and said piston being movable from said second to said first position and incident thereto taking up said lost motion movement to restore said abutting connection and actuating said motion transmitting means to effect shift of said shiftable element from its said engaged to its said disengaged position, an ignition interrupting switch having an operating element disposed adjacent said motion transmitting means, a switch actuating member carried by said motion transmitting means and movable therewith along a predetermined path relative to said operating element, said actuating member being also movable relative to said motion transmitting means but along a different path, said switch actuating member having a position spaced from said switch operating element in the direction of said predetermined path of movement when said motion transmitting means and piston are in their positions corresponding to the disengaged position of said shiftable element and having another position in juxtaposition to said operating element when said motion transmitting means and piston are in their positions corresponding to said engaged position of said shiftable element, and means on said piston operable upon said switch actuating member during said take up movement of said piston from its second to its first position for moving said actuating member from a first to a second position in said different path of movement to actuate said switch operating element whereby the latter will condition said switch for interrupting the ignition system and being movable thereafter with said motion transmitting means to the said first position of the latter for accommodating conditioning of said switch to restore the ignition system, said switch actuating member being adapted for movement to its first position in said different path of movement from its second position as an incident to movement of said piston from its said first to its said second position whereby said switch operating element will not be actuated by said switch actuating member during shift of said shiftable element from its disengaged to its engaged position.

11. In a power transmission for driving a vehicle having an engine provided with an ignition system, a shiftable transmission drive control element, another drive control element engageable with said shiftable element, motion transmitting means operable for shifting said shiftable element from a first position of disengagement relative to said other control element to a second position of engagement relative thereto and out of said second position when operation of said ignition system is momentarily interrupted to relieve the thrust load at said shiftable element, power means including a reciprocable element operable upon said motion transmitting means for effecting shift of said shiftable control element between said positions, means providing an abutting connecting between said reciprocable element and said motion transmitting means, said reciprocable element being movable from a first position corresponding to said disengaged position of said shiftable element and wherein said abutting connection is established to a second position and incident to said movement releasing said connection and obtaining lost motion movement between said reciprocable element and motion transmitting means to condition the latter for effecting engaging shift of said shiftable element, said reciprocable element being also movable from said second position to said first position and incident thereto taking up said lost motion movement to restore said abutting connection and actuating said motion transmitting means to effect shift of said shiftable element from its said engaged to its said disengaged position, a normally open switch operable when closed for interrupting the ignition system, and movable switch actuating means carried by one of said motion transmitting means and reciprocable element, operable by the other thereof in response to movement of said reciprocable element to take up said lost motion movement for actuating said switch to interrupt said ignition system, and accommodating restoration of said ignition system during movement of said reciprocable element from its said second to its said first position following re-establishment of said abutting connection.

12. In a power transmission for driving a vehicle having an engine provided with an ignition system; a shiftable transmission drive controlling element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable element, actuating means operable upon said motion transmitting means for effecting shift of said shiftable drive control element between its two said positions, circuit means including electromagnetically operable means for controlling said actuating means, speed responsive switch means in series electrically with said electromagnetically operable means for controlling said electromagnetically operable means and ignition interrupting switch means in series electrically with said speed responsive switch means, a movable member movable with said motion transmitting means and selectively positionable in two positions in one of which only it is adapted to actuate said ignition interrupting switch means, and means on said first mentioned actuating means operable for directing said member into said one position and operable for accommodating movement of said member to the other of said two positions.

13. In a power transmission for driving a vehicle having an engine provided with an ignition system; a shiftable transmision drive controlling element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable element, actuating means operable upon said motion transmitting means for effecting shift of said shiftable drive control element between its two said positions, electromagnetically operable means for controlling said shift actuating means, switch means for controlling said electromagnetically operable means, said switch means having an open and a closed position and operable when closed for energizing said electromagnetically operable means, an ignition interrupting switch having an open and a closed position and operable when closed for applying a ground to said primary winding for interrupting the ignition when said switch means is also closed, said switch means being in series electrically with each of said electromagnetically operable means and said interrupting switch, a movable switch actuating member movable with said motion transmitting means and selectively positionable in two positions in one of which only it is adapted to close said interrupting switch, and means on said first mentioned actuating means operable for directing said switch actuating member into said one position when effecting disengaging shift of said shiftable element and accommodating movement of said switch actuating member to the other of said two positions when effecting engaging shift of said shiftable element.

WILLIAM T. DUNN.

REFERENCES CITED

The following references are of record in the file of this patent:

UNITED STATES PATENTS

| Number | Name | Date |
|---|---|---|
| 2,426,234 | Neracher et al. | Aug. 26, 1937 |
| 2,440,558 | Price | Apr. 27, 1948 |
| 2,579,693 | Orr | Dec. 25, 1951 |